(12) United States Patent
Jiang

(10) Patent No.: US 11,608,778 B2
(45) Date of Patent: Mar. 21, 2023

(54) GAS TURBINE ENGINE

(71) Applicant: Kyle Jiang, Birmingham (GB)

(72) Inventor: Kyle Jiang, Birmingham (GB)

( * ) Notice: Subject to any disclaimer, the term of this patent is extended or adjusted under 35 U.S.C. 154(b) by 128 days.

(21) Appl. No.: 16/344,556

(22) PCT Filed: Oct. 24, 2017

(86) PCT No.: PCT/GB2017/053202
§ 371 (c)(1),
(2) Date: Apr. 24, 2019

(87) PCT Pub. No.: WO2018/078350
PCT Pub. Date: May 3, 2018

(65) Prior Publication Data
US 2020/0049062 A1 Feb. 13, 2020

(30) Foreign Application Priority Data

Oct. 25, 2016 (GB) .................................. 1618016

(51) Int. Cl.
*F02C 3/05* (2006.01)
*F02C 3/14* (2006.01)
*F23R 3/42* (2006.01)

(52) U.S. Cl.
CPC .................. *F02C 3/05* (2013.01); *F02C 3/14* (2013.01); *F23R 3/425* (2013.01)

(58) Field of Classification Search
CPC .... F02C 3/05; F02C 3/085; F02C 7/10; F02C 7/08; F02C 3/08; F23R 3/425; F23R 3/44; F23R 3/46
See application file for complete search history.

(56) References Cited

U.S. PATENT DOCUMENTS

| | | | |
|---|---|---|---|
| 2,567,079 A | 9/1951 | Owner et al. | |
| 2,709,893 A * | 6/1955 | Birmann | F02C 7/18 60/39.511 |
| 2,792,197 A * | 5/1957 | Wood | F02C 3/085 415/106 |
| 3,010,281 A | 11/1961 | Cervenka et al. | |

(Continued)

FOREIGN PATENT DOCUMENTS

| | | |
|---|---|---|
| DE | 3420191 A1 | 11/1984 |
| EP | 1722069 A1 | 11/2006 |

(Continued)

*Primary Examiner* — Gerald L Sung
*Assistant Examiner* — Alyson Joan Harrington
(74) *Attorney, Agent, or Firm* — Dickinson Wright PLLC

(57) ABSTRACT

A gas turbine engine (1) has a centrifugal compressor (4) and a radial turbine (14) mounted to a turbine shaft (2) for rotation with the shaft about the shaft axis Z. A number of combustion chambers (10) in the air/gas flow path between the compressor and the turbine are spaced circumferentially about the shaft axis. The combustion chambers (10) are elongate in the direction of air/gas flow and the longitudinal axis of each combustion chamber is skewed transversely relative to the axis Z of the turbine shaft. The combustion chambers (10) may be curved longitudinally about the shaft axis and may be aligned concentric about the axis. The engine may have a recuperator (8) radially outboard the compressor, the recuperator having radially directed flow passages through which air from the compressor is directed.

19 Claims, 6 Drawing Sheets

(56) References Cited

U.S. PATENT DOCUMENTS

| | | | |
|---|---|---|---|
| 3,238,718 A * | 3/1966 | Hill | F02C 3/085 |
| | | | 60/39.37 |
| 3,626,694 A | 12/1971 | Holste | |
| 3,818,696 A | 6/1974 | Beaufrere | |
| 4,382,359 A * | 5/1983 | Sampayo | F28D 7/06 |
| | | | 60/39.511 |
| 5,855,112 A * | 1/1999 | Bannai | F23R 3/44 |
| | | | 60/39.511 |
| 6,189,314 B1 * | 2/2001 | Yamamoto | F23R 3/12 |
| | | | 60/737 |
| 6,951,110 B2 * | 10/2005 | Kang | F02C 7/08 |
| | | | 60/772 |
| 7,254,937 B2 * | 8/2007 | Hull | F02C 7/08 |
| | | | 60/266 |
| 8,387,357 B2 * | 3/2013 | Jewess | F02C 3/05 |
| | | | 60/39.511 |
| 9,388,741 B2 * | 7/2016 | Gekht | F02C 7/10 |
| 9,394,828 B2 * | 7/2016 | Eleftheriou | F28D 21/001 |
| 2002/0124569 A1 | 9/2002 | Treece et al. | |
| 2009/0232676 A1 * | 9/2009 | Mowill | F02C 3/145 |
| | | | 417/409 |
| 2010/0037623 A1 | 2/2010 | Jewess et al. | |
| 2010/0162724 A1 * | 7/2010 | Myers | F23R 3/26 |
| | | | 60/794 |
| 2015/0020500 A1 | 1/2015 | Kling et al. | |
| 2019/0291590 A1 * | 9/2019 | Yeung | B60L 15/20 |

FOREIGN PATENT DOCUMENTS

| | | |
|---|---|---|
| JP | H03-505247 A | 11/1991 |
| JP | H08-246903 A | 9/1996 |
| JP | H09-133029 A | 5/1997 |
| WO | 200239045 A2 | 5/2002 |

\* cited by examiner

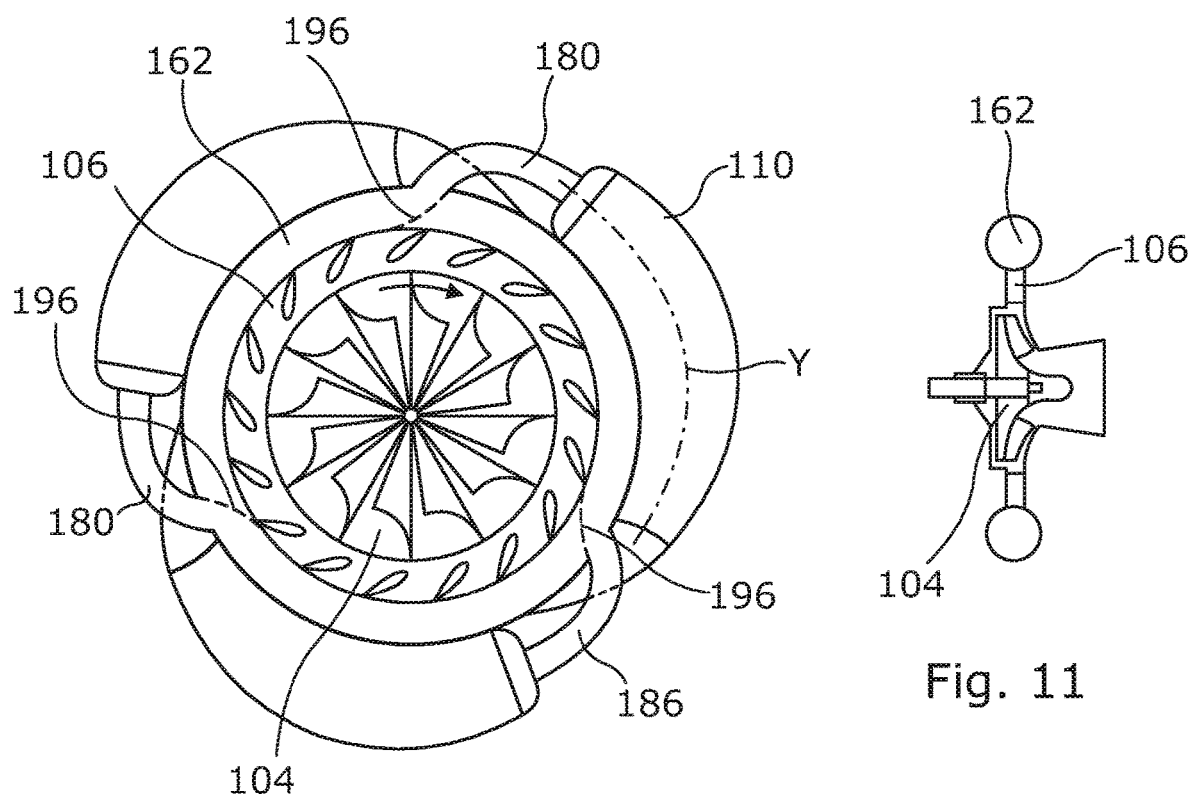
Fig. 10
Fig. 11
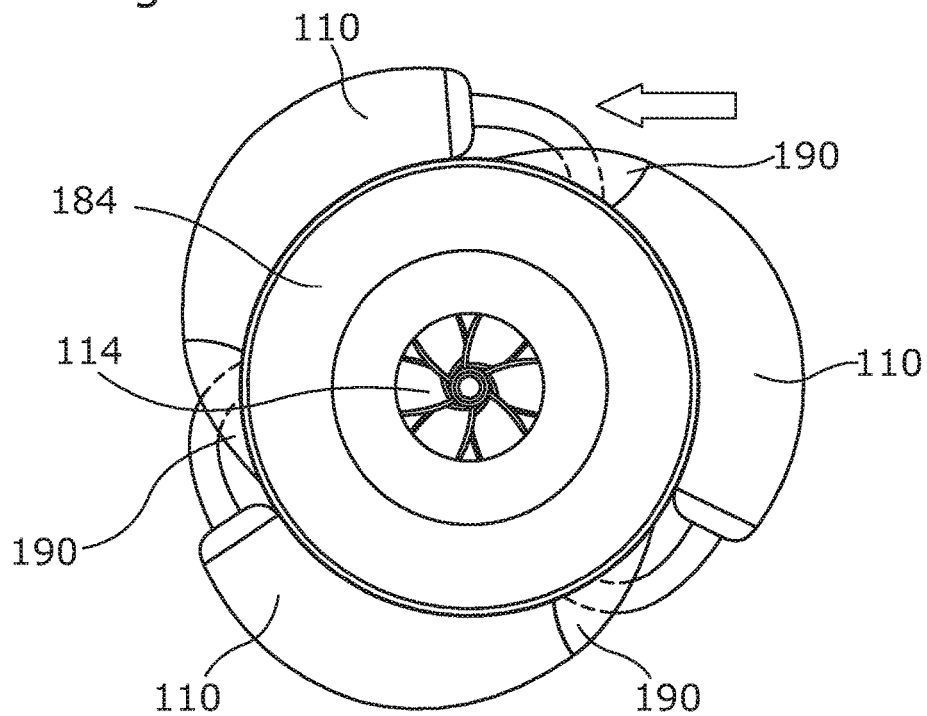
Fig. 12

GAS TURBINE ENGINE

CROSS-REFERENCE TO RELATED APPLICATIONS

This application claim priority from PCT/GB2017/053202, filed on Oct. 24, 2017, which claims priority from GB 1618016.8, filed Oct. 25, 2016, the contents of which (including all attachments filed therewith) are hereby incorporated by reference in their entirety.

TECHNICAL FIELD OF THE INVENTION

The present invention relates to a gas turbine engine and to a method of operating a gas turbine engine.

BACKGROUND TO THE INVENTION

Gas turbine engines are known which have an upstream rotating compressor coupled to a downstream turbine, and a combustion chamber located in the flow path in between. In the basic operation of a gas turbine, air flows through the compressor where its pressure is raised, fuel is sprayed into the compressed air and ignited in the combustion chamber to generate a high-temperature exhaust gas flow which enters the turbine. The high-temperature exhaust gas flow expands as it passes through the turbine down to the exhaust pressure, producing a turbine shaft work output in the process. The turbine shaft work is used to drive the compressor and can be used to drive other devices, such as an electric generator, that may be coupled to the shaft. Energy that is not used for shaft work comes out in the exhaust gas which has a high temperature and velocity.

Smaller gas turbine engines, sometimes referred to as "mini-turbines" or "micro-turbines", have recently been developed for use in particular in distributed electrical generation and combined heat and power applications. Known micro- and mini-turbines tend to be simple engines employing centrifugal compressor and radial turbine wheels with a single stage of each. In the known mini- and micro-turbines, the exhaust gas and the compressed air are passed through a form of heat exchanger known as a recuperator where heat energy is transferred from the exhaust gas into the compressed air upstream of the combustion chamber to improve the overall efficiency of the engine. Typically, the known mini- and micro-gas turbine engines having power ratings ranging from 30 kW up to 1 MW and above. For use in electrical power generation, it is known to combine a small gas turbine engine with an electrical generator in a single assembly often referred to as a "turbogenerator".

In some conventional lager gas turbine engines, the compressor, combustion chamber and turbine are arranged sequentially in-line so that the air flows axially through the engine from one to the other. Axial-flow turbo fan jet engines are an example of this configuration. However, in some known mini- and micro-gas turbine engines, the compressor and turbine are located adjacent one another within an annular recuperator. Compressed air is directed radially outwardly from the compressor to the recuperator where it is turned though 90° to flow through the recuperator in a first axial direction before being directed radially inwardly and then in a reverse axial direction to pass through the combustion chamber and back to the turbine.

Whilst the known engines are satisfactory, there is a need for an alternative gas turbine engine which overcomes, or at least mitigates, some of the deficiencies of the known engines.

In particular, there is a need for an alternative gas turbine engine which is more efficient than known mini- and micro gas turbine engines having an equivalent power output.

There is also a need for a gas turbine which is more compact and/or which has a different overall shape than known gas turbine engines having an equivalent power output.

There is a further need for a gas turbine engine which is more versatile over a range of operating conditions.

There is also a need for an alternative gas turbine engine which has improved scalability.

SUMMARY OF THE INVENTION

According to a first aspect of the invention, there is provided a gas turbine engine comprising a turbine shaft rotatable about a longitudinal axis of the shaft, a centrifugal compressor and a radial turbine each mounted to the shaft for rotation therewith about said axis, and a plurality of combustion chambers in an air/gas flow path between the compressor and the turbine; in which the combustion chambers are spaced circumferentially about said longitudinal axis of the turbine shaft, each combustion chamber being elongate in the direction of air/gas flow through the combustion chamber and having a longitudinal axis, wherein the longitudinal axis of each combustion chamber is placed generally in a transverse direction relative to the axis of the turbine shaft.

In an embodiment, the combustion chambers are curved in the longitudinal direction, the longitudinal axis of each combustion chamber curves about the axis of the turbine shaft.

In an alternative embodiment, the combustion chambers are straight in the longitudinal direction and the axis of each combustion chamber does not extend in longitudinal plane of the turbine shaft.

The longitudinal axis of each of the combustion chambers may also be inclined radially relative to the axis of the turbine shaft.

In a gas turbine engine according to the first aspect of the engine, the longitudinal axes of the combustion chambers do not converge at a single point and in particular do not converge at the longitudinal axis of the turbine shaft. The longitudinal axes of the combustion chambers, if extended, do not intersect the longitudinal axis of the turbine shaft. The longitudinal axes of the combustion chambers do not lie in planes extending longitudinally through the axis of the turbine shaft. The longitudinal axes of the combustion chambers are each skewed tangentially relative to planes extending longitudinally through the axis of the turbine shaft and which pass through the longitudinal axis of the combustion chamber.

The longitudinal axis of each combustion chamber may be skewed generally in a transverse direction relative to the axis of the turbine shaft by at least 30 degrees, or by at least 40 degrees, or by at least 45 degrees, or by at least 50 degrees, or by at least 55 degrees, or by at least 65 degrees, or by at least 70 degrees, or by at least 75 degrees, or by at least 80 degrees, or by at least 85 degrees, or by 90 degrees.

The longitudinal axes of the combustion chambers may each be skewed at substantially 90 degrees transversely to the axis of the turbine shaft.

In an embodiment, the longitudinal axes of the combustion chambers all lie substantially in a common plane extending transversely to the axis of the turbine shaft.

In an embodiment, the combustion chambers extend longitudinally generally concentrically about the axis of the turbine shaft.

Where the combustion chambers are straight in the longitudinal direction, the longitudinal axes of the combustion chambers may each be aligned tangentially to a circle drawn concentrically about the longitudinal axis of the turbine shaft.

Where the combustion chambers are curved longitudinally, the degree of curvature may be constant over the length of the combustion chambers or may vary. The longitudinal axes of the combustion chambers may curve generally concentrically about the axis of the turbine shaft. The longitudinal axis of each of the combustion chambers may spiral about the axis of the turbine shaft.

The combustion chambers may be arranged in an annulus about the axis of the turbine shaft.

The combustion chambers may be substantially cylindrical, at least over the majority of their length. The combustion chambers each have an inlet end and an outlet end and may be tapered at their outlet ends. The outlet ends of the combustion chambers may taper inwardly, getting narrower towards the outlet. Where the combustion chambers are curved longitudinally, they may be in the form of a curved cylinder, at least over the majority of their length.

The combustion chambers may be can type combustors.

In an embodiment, there are three combustion chambers circumferentially spaced about the axis of the turbine shaft.

The engine may have an annular recuperator having a first set of flow passages for receiving compressed air from the centrifugal compressor and a second set of flow passages interleaved between the first flow passages, the second set of flow passages being fluidly connected with the turbine for receiving exhaust gas from the turbine. In an embodiment, the first set flow passages extend substantially in a radial direction. In one embodiment, the second set of flow passages in the recuperator extend generally in an axial direction. In another embodiment, the second set of flow passages in the recuperator extend generally in a radial direction relative to the axis of the turbine shaft. The combustion chambers may be positioned radially outboard of an inner diameter of the recuperator and radially inboard of an outer diameter of the recuperator.

The engine may have a circumferentially extending air flow buffer channel in the flow path between the centrifugal compressor and the combustion chambers. The air flow buffer channel may be fluidly connected with each combustion chamber by a respective air conduit such as a tube. The air flow buffer channel may be divided into a number of sectors, each sector fluidly connected with a respective one of the combustion chambers. Alternatively, the air flow buffer channel may define a substantially continual annular flow path. Where the engine has a recuperator, the air flow buffer channel is fluidly connected with the first set of flow passages. In this embodiment, the combustion chambers may be positioned radially inboard of the air flow buffer channel.

The engine may have a diffuser located circumferentially about an outer dimeter of the compressor. The diffuser may be configured to direct compressed air radially outwardly. The direction of air flow through the diffuser may have substantially no axial component. Where the engine has a recuperator, the diffuser may be located within an inner diameter of the annular recuperator to direct air radially into the first set of flow passages in the recuperator. Where the engine does not have a recuperator, the diffuser may be located radially within the circumferentially extending air flow buffer channel as described above, such that compressed air from the compressor is directed into the air flow buffer channel through the diffuser.

The engine may have a nozzle located circumferentially about an outer diameter of the turbine for directing exhaust gas onto the turbine and wherein the engine defines an exhaust gas flow buffer channel extending circumferentially about the nozzle, the exhaust gas flow buffer channel being fluidly connected with the combustion chambers and with the nozzle. Where the engine also has a circumferentially extending air flow buffer chamber, the engine may define an air/gas flow path from the air buffer channel through each of the combustion chambers to the exhaust gas flow buffer which air/gas flow path circulates generally in a circumferential direction about the axis of the turbine shaft. Each of the air/gas flow paths may spiral about the axis of the turbine shaft from the air flow buffer channel to the exhaust gas buffer channel through a respective one of the combustion chambers.

In an embodiment, the engine defines an air/gas flow path from the diffuser to the turbine which circulates about the axis of the turbine shaft in a generally circumferential direction. In an embodiment, the engine defines an air/gas flow path from the diffuser to the turbine which spirals about the axis of the turbine shaft.

The centrifugal compressor and the radial turbine may both be mounted to the turbine shaft with their blades facing in the same axial direction, especially where the engine has an annular recuperator radially outboard of the compressor.

The gas turbine engine may have an outer housing shaped generally as a flattened sphere. The housing may have opposed side walls which are generally flat and parallel to one another in regions radially surrounding the axis of the turbine shaft.

The engine may have an engine control system configured to independently control combustion in each of the combustion chambers, the engine control system being configured to vary the number of combustion chambers in which combustion takes place whilst the engine is running in dependence on operating parameters of the engine. The control system may be configured to vary the number of combustion chambers in which combustion takes place in dependence on a demanded power output of the engine.

In accordance with a second aspect of the invention, there is provided a gas turbine engine comprising a turbine shaft rotatable about an axis, a centrifugal compressor and a radial turbine, each mounted to the shaft for rotation with the shaft about the axis, an annular recuperator circumferentially surrounding the centrifugal compressor, and at least one combustion chamber in an air/gas flow path between the recuperator and the turbine; in which the recuperator has a first set of flow passages for receiving compressed air from the centrifugal compressor, the first set flow passages extending in a radial direction, the recuperator having a second set of flow passages interleaved between the first flow passages, the second set of flow passages being fluidly connected with the turbine for receiving exhaust gas from the turbine.

In accordance with a third aspect of the invention, there is provided a gas turbine engine comprising a turbine shaft rotatable about an axis, a centrifugal compressor and a radial turbine each mounted to the shaft for rotation with the shaft about the axis, the centrifugal compressor being mounted to the turbine shaft towards a forward end of the shaft, the radial turbine being mounted to the shaft axially behind the centrifugal compressor; an annular recuperator circumferentially surrounding the centrifugal compressor, the recuperator having a first set flow passages for receiving compressed air from the centrifugal compressor and a second set of flow passages for receiving exhaust gas from the turbine, the first set flow passages extending generally in a radial direction, a plurality of can type combustors located axially behind the recuperator and radially outboard of the turbine, the combustors each having a longitudinal axis skewed in a transverse direction relative to the axis of the turbine shaft.

In accordance with a fourth aspect of the invention, there is provided a gas turbine engine comprising a turbine shaft rotatable about an axis, a centrifugal compressor and a radial turbine each mounted to the shaft for rotation with the shaft about the axis, an annular recuperator circumferentially surrounding the centrifugal compressor, and at least one combustion chamber in an air/gas flow path between the recuperator and the turbine; in which the recuperator has a first set of flow passages for receiving compressed air from the centrifugal compressor, the first set flow passages extending generally in a radial direction, the recuperator having a second set of flow passages for receiving exhaust gas from the turbine; the at least one combustion chamber being elongate and having a longitudinal axis angled relative to the axis of the turbine shaft, the at least one combustion chamber being positioned radially outboard of the turbine.

In accordance with a still further aspect of the invention, there is provided a gas turbine engine comprising a turbine shaft rotatable about an axis, a centrifugal compressor and a radial turbine each mounted to the shaft for rotation with the shaft about the axis, the radial turbine being mounted to the turbine shaft axially behind the centrifugal compressor; an annular recuperator circumferentially surrounding the centrifugal compressor, the recuperator having a first set flow passages for receiving compressed air from the centrifugal compressor and a second set of flow passages for receiving exhaust gas from the turbine, the first set flow passages extending generally in a radial direction, a plurality of can type combustors located axially behind the recuperator and radially outboard of the turbine, the combustors each having a longitudinal axis, the axes of the combustors lying in a common transverse plane extending perpendicular to the axis of the turbine shaft.

The combustors may be curved about the axis of the turbine shaft and/or they may taper at an outlet end.

The radial turbine may be mounted with its blades facing forwardly towards the compressor and recuperator such that, in use, exhaust gas leaving the turbine are directed axially forwardly toward the second set of flow passage in the recuperator.

The engine may have an outer housing shaped generally as a flattened sphere. The housing may have opposed side walls which are generally flat and parallel to one another in regions radially surrounding the axis of the turbine shaft. The housing may define one or more outlet nozzles at a reward side.

The second set of flow passages in the recuperator may extend generally in a radial direction or generally in an axial direction.

In accordance with a further aspect of the invention, there is provided a method of operating a gas turbine engine having a plurality of combustions chambers, wherein combustion within each of the combustion chambers is independently controlled in dependence on at least one operating parameter of the engine.

In an embodiment, the number of combustion chambers in which combustion takes place is varied whilst the engine in running in dependence on at least one operating parameter of the engine. The method may comprise running the engine with combustion taking place in only one or some of the combustion chambers when the engine is operated below full power.

The method may be applied to an engine in accordance with any of the previous aspects of the invention outlined above.

DETAILED DESCRIPTION OF THE INVENTION

In order that the invention may be more clearly understood an embodiment thereof will now be described, by way of example only, with reference to the accompanying drawings, of which:

FIG. 10 is a view from the front of the compressor stage of the engine of FIG. 9 illustrating schematically the provision of an annular air flow buffer channel located circumferentially outboard of a diffuser and compressor wheel of the engine and illustrating schematically a fluid connection of the air flow buffer channel to the combustion chambers;

Figure 9:
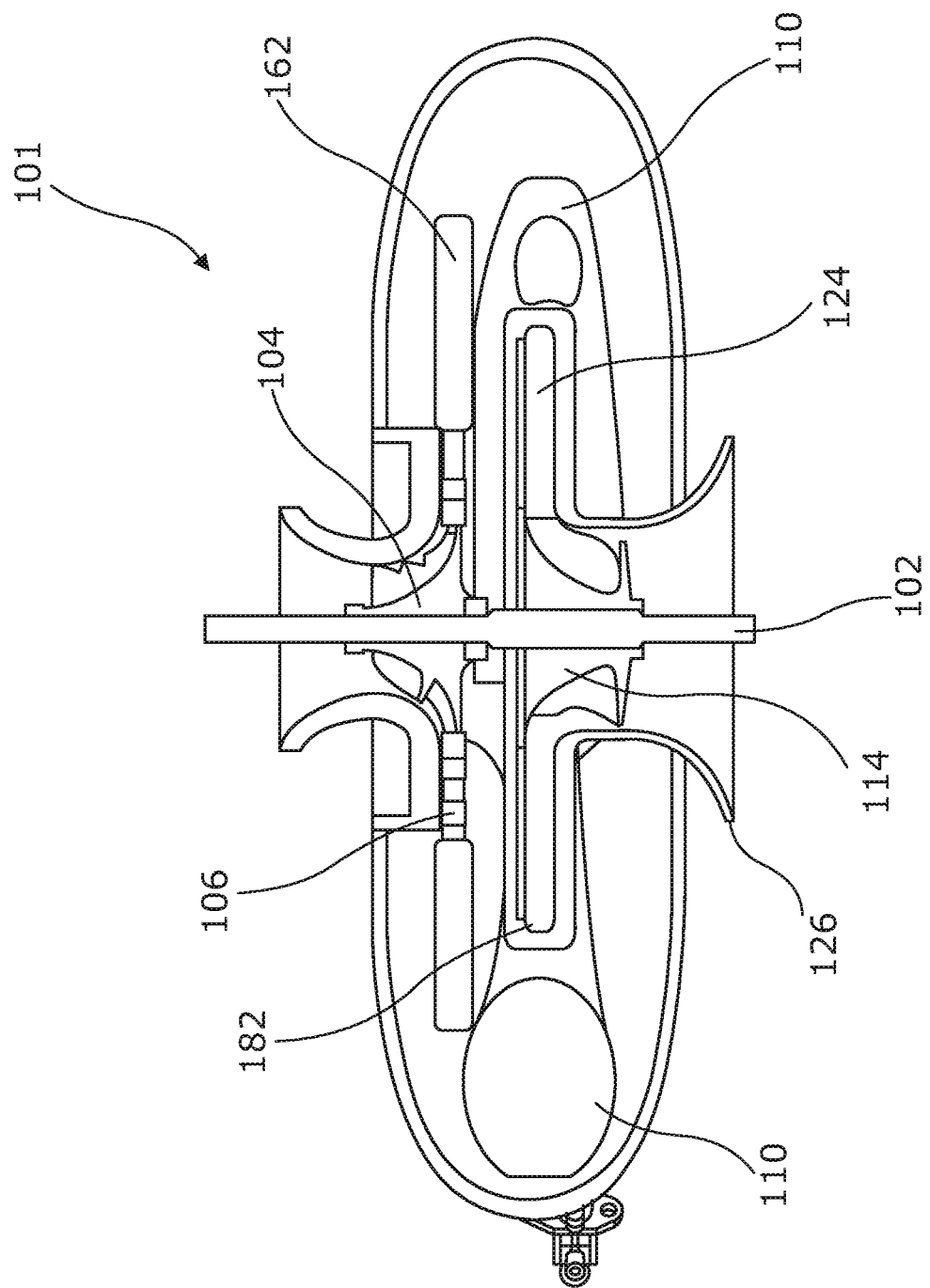
FIG. 9 is a view similar to that of FIG. 4 but illustrating an alternative embodiment of a gas turbine engine in accordance with an aspect of the invention which does not have a recuperator.

FIG. 11 is a schematic, longitudinal cross sectional view through the compressor stage of FIG. 10 on a reduced scale illustrating the location of the air buffer channel; and FIG. 12 is a schematic view from the rear of the turbine stage of the engine of FIG. 9 illustrating how the combustion chambers are fluidly connected with an annular exhaust gas flow buffer channel located circumferentially outboard of the nozzle and turbine.

A first embodiment of a gas turbine engine 1 in accordance with an aspect of the invention is shown in FIGS. 1 to 8 of the accompanying drawings.

The engine 1 includes a turbine shaft 2, a centrifugal compressor wheel 4 (sometimes called a radial compressor), an annular diffuser 6, a recuperator 8, three combustion chambers 10, an annular nozzle 12, and a radial turbine wheel 14. The centrifugal compressor wheel 4 and the turbine wheel 14 are both mounted to the shaft 2 for rotation with the shaft about its longitudinal axis Z.

The engine 1 has a housing 16 including an outer casing 18. The outer casing 18 has an overall shape of a hollow flattened sphere with an inlet side wall 20 and an exhaust side wall 22 which are generally planar and parallel to one another in a central region about the axis Z, which axis Z is coincident with the minor axis of the flattened sphere. The housing 16 includes an air inlet nozzle 24 located centrally about the axis Z on the inlet side and a pair of circular outlet nozzles 26 spaced radially outwards from the axis Z on the exhaust side.

The longitudinal axis Z of the shaft 2 defines a longitudinal axis of the engine. Throughout the description and claims, the directional terms "axial", "axially", "radial", "radially", "circumferential", and circumferentially" and the like are to be understood as being defined by reference to the axis Z of the turbine shaft 2, unless the context requires otherwise. References to a "transverse" direction relative to the axis Z of the shaft should be understood as referring to a direction extending in a transverse plane perpendicular (normal) to the longitudinal axis Z of the shaft For ease of reference, the inlet side of the engine 1 will be referred to as a forward side or front of the engine whilst the exhaust side will be referred to as the reward side or rear of the engine. However, it should be understood that use of these terms does not imply any limitation on the orientation in which the engine 1 can be used. The engine 1 can be used in any desired orientation and could, for example, be oriented with the axis Z aligned vertically and with the inlet side 20 at the top or bottom. Furthermore, if used in a vehicle, the engine 1 could be mounted with inlet side 20 facing the rear of the vehicle or to the side or in any other orientation relative to the vehicle.

The shaft 2 is mounted in the housing for rotation about its axis Z by means of bearings 28. Any suitable bearings 28 can be used but in an embodiment the bearings 28 are air bearings. Where air bearings are used, they may be aerostatic or aerodynamic type bearings. In an embodiment least some of the air bearings are hybrid bearings capable of generating a cushion of air aerodynamically but in which pressurised air is introduced into the bearings from a source when they are rotating a low speeds. The supply of air from the external source is reduced or stopped altogether when the speed of rotation of the bearings is such that the aerodynamic effect of the bearings is sufficient to generate a cushion of air for supporting the required loads. With this type of hybrid air bearing arrangement, pressurised air from the source need be introduced into the bearings only during start-up and shut-down phases of operation of the engine. This improves the overall efficiency of the engine compared with an engine using aerostatic bearings but reduces the risk of damage when operating at low speed when compared with an engine using aerodynamic bearings.

The shaft 2 projects outside the housing 16 through the exhaust side wall 22 for driving attachment to ancillary equipment. In alternative embodiments, the shaft 2 could project outside the housing 16 at the forward, inlet side for driving attachment to ancillary equipment or the engine could be combined with ancillary equipment driven by the shaft 2 in a single assembly.

The centrifugal compressor wheel 4 is located towards the forward, inlet end of the shaft 2 and has blades 32 which face towards the inlet or front side of the engine. Mounted circumferentially about the outer diameter of the centrifugal compressor wheel is the annular diffuser 6, having blades 33 which also face the inlet or forward side of the engine. The centrifugal compressor wheel 4 and the diffuser 6 are located between a first compressor housing member 34 and a second compressor housing member 36, which together form a compressor stage housing. The first compressor housing member 34 is located about the forward, inlet side of the compressor wheel 4 and diffuser 6 whilst the second compressor housing member 36 is located about the rearward side of the compressor wheel 4 and diffuser 6. The first compressor housing member 34 has a tubular wall 38 which encases the inlet side of the compressor wheel 4 and diffuser 6 and which extends through an opening 40 in the inlet side wall 20 of the casing 18 to define the air inlet nozzle 24. The tubular wall 38 has a first end 42 which forms an air inlet opening outside the casing 18. The tubular wall 38 curves radially inwardly from the first end 42 to define a narrow throat just in front of the compressor wheel 4 and then extends radially outwardly to encase the inlet (forward) side of centrifugal compressor wheel 4 and the diffuser 6. The inner end of the tubular wall 38 has a cylindrical portion 44 which protects forwardly towards the inner surface of the inlet side wall 20 of the casing 18 radially outside the opening 40. The inwardly curving region of the tubular wall 38 defines a convergent duct for directing air into the centrifugal compressor 4. The first compressor housing member 34 has a cylindrical body 46 located centrally within the convergent duct region of the tubular wall 38. The cylindrical body 46 has a central bore within which a forward, inlet end of the shaft 2 is supported and which is connected to the outer tubular wall 38 by means of a number of radial ribs or spars 47. Air is able to flow through the inlet nozzle 24 between the outer tubular wall 38 and the cylindrical body 46, passing through gaps between the ribs or spars to reach the centrifugal compressor wheel 4.

The radial turbine wheel 14 is mounted to the shaft 2 axially to the rear of the second compressor housing member 36. The turbine wheel 14 has blades 48 which face the front or inlet side of the engine so that the turbine wheel 14 is mounted on the shaft 2 facing in same axial direction as the compressor wheel 4. The annular nozzle 12 is located about the outer dimeter of the turbine wheel 14 and has a plurality of blades 52 which define nozzles for directing exhaust gas onto the blades 48 of the turbine wheel 14. The blades 52 on the nozzle 12 also face the forward, inlet side of the engine.

The recuperator 8 is annular and is located within the casing 18 radially outboard of the diffuser 6 and the first and second compressor housing members 34, 36, The first and second compressor housing members 34, 36 combine with the casing 18 and shaft 2 to define an enclosure or plenum through which ambient air A is drawn into the centrifugal compressor wheel 4 from the exterior of the engine 1 and directed radially outwardly through the diffuser 6 into the recuperator 8 though one or more outlets in the compressor stage housing, as indicated by the arrow B.

Figure 1:
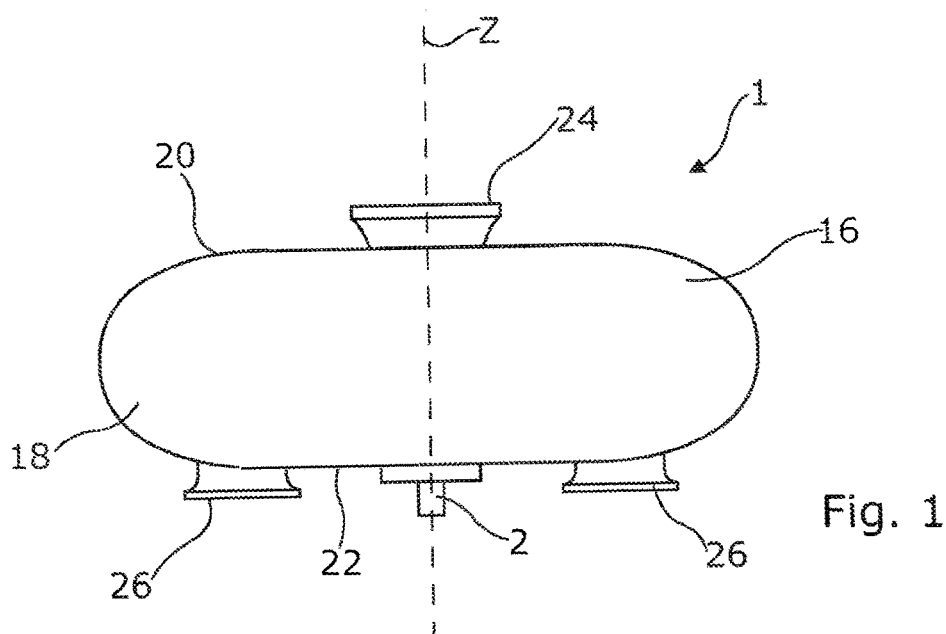
FIG. 1 is a view from above of an embodiment of a gas turbine engine in accordance with an aspect of the invention.
Figures 2, 3:
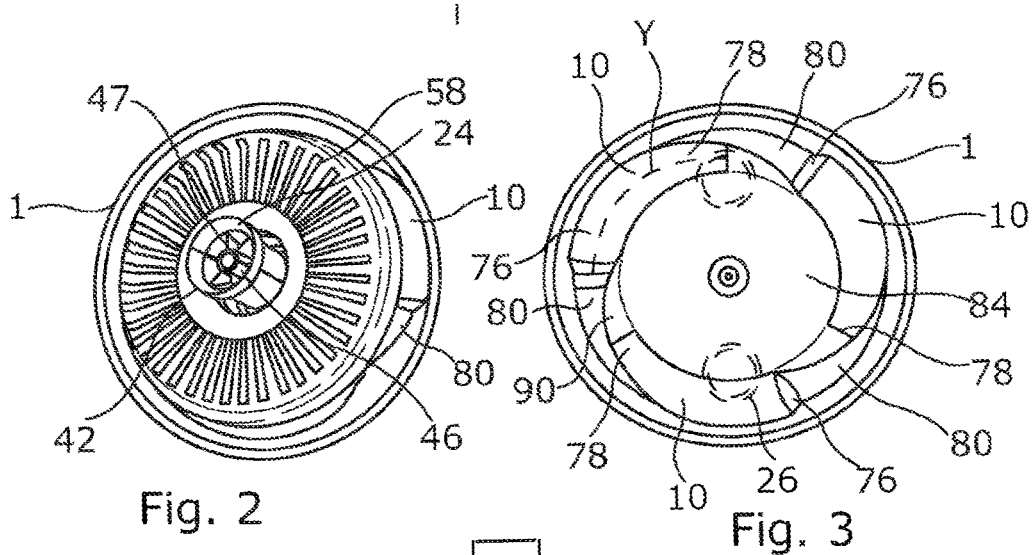
FIG. 2 is a perspective view from the front and to one side of the engine of FIG. 1, with parts of an outer casing of the engine ghosted to show internal details.
FIG. 3 is a view from the rear of the engine of FIG. 1, with parts of an outer casing of the engine ghosted to show internal details.
Figure 4:
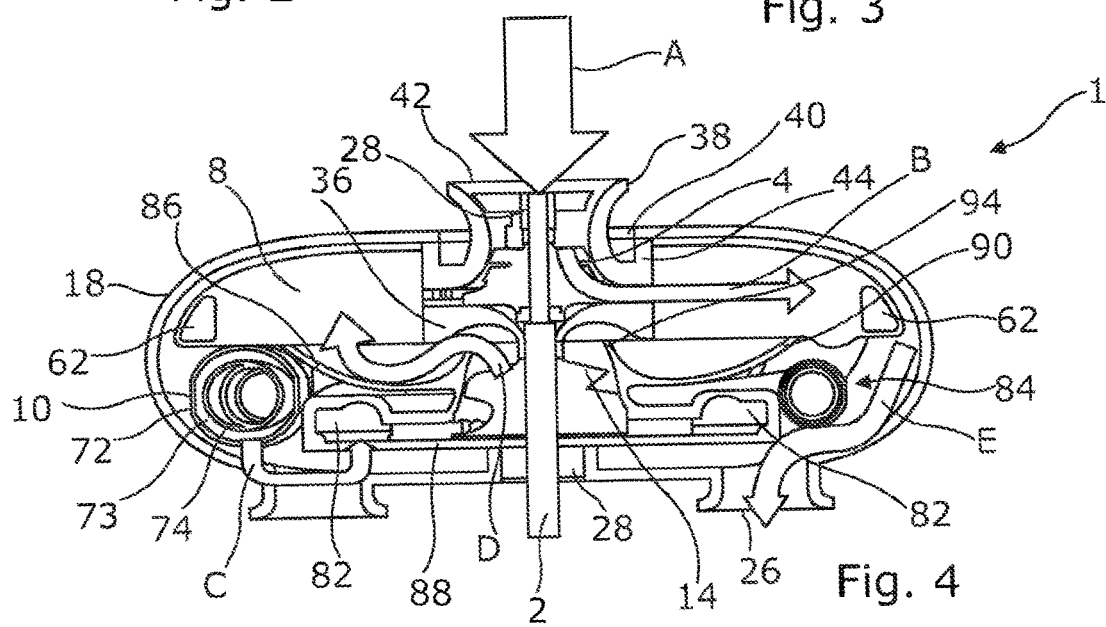
FIG. 4 is a somewhat schematic cross-sectional view through the engine of FIG. 1.
Figure 5:
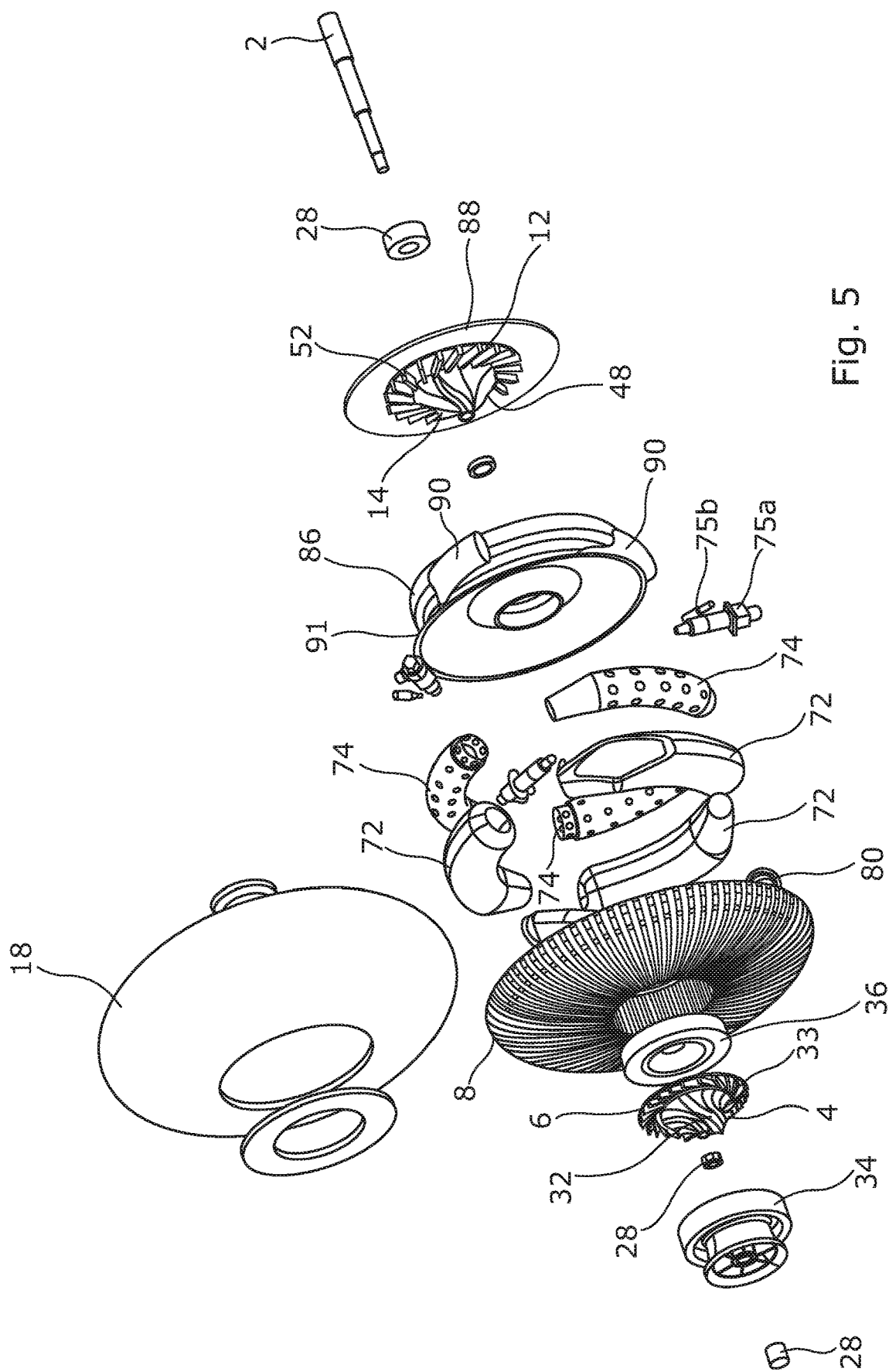
FIG. 5 is an exploded perspective view of the engine of FIG. 1.
Figure 6:
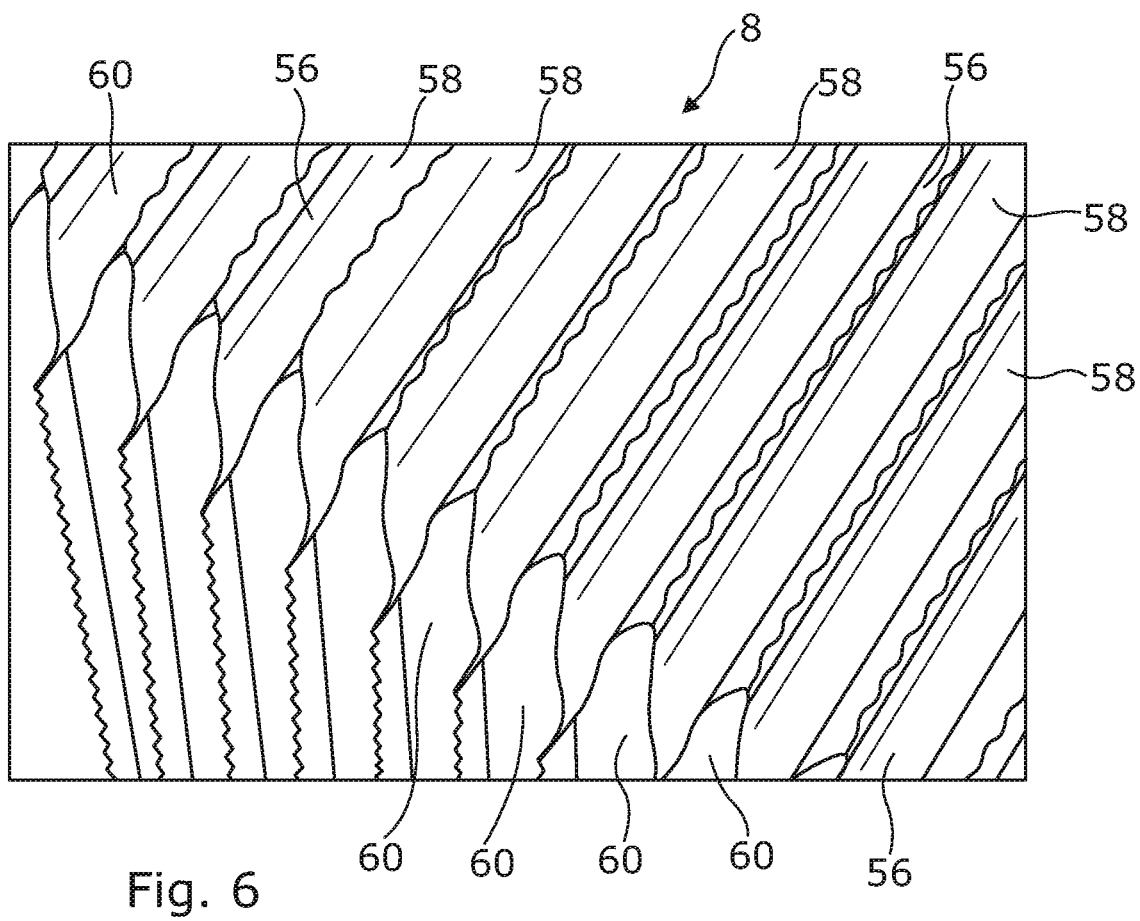
FIG. 6 is a perspective view of part of a recuperator forming part of the engine of FIG. 1.

Part of the structure of the recuperator 8 can be seen in FIG. 6. The recuperator 8 comprises a plurality of plates 56 which are spaced apart from one another and connected together in adjacent pairs to define two sets of interleaved flow passages 58, 60. A first set of flow passages 58 for receiving compressed inlet air from the diffuser 6 extend radially outwardly from the inner circumference of the recuperator to an air flow buffer channel 62 which extends about an outer circumferential region of the recuperator. A second set of flow passages 60 for the exhaust gas extend through recuperator in an axial direction of the engine. As can be seen in FIG. 6, each plate 56 is sealingly joined to an adjacent plate on one side along a first pair of opposed edges and is sealingly joined to an adjacent plate on the opposite side along a second pair of opposed edges. The plates 56 in the recuperator 8 are made of suitable materials for effective heat transfer from the exhaust gas to the inlet air. Suitable materials include metals, such as stainless steel, for example.

The three combustion chambers 10, referred to below as combustors, are located radially outboard of the turbine wheel 14 and nozzle 12 axially to the rear of the recuperator 8. In the present embodiment, the combustors 10 do not extend radially beyond the outer circumference of the air flow buffer channel 62. The combustors 10 in this embodiment are all located substantially within a common transverse plane which extends perpendicular (normal) to the axis Z. Each combustor 10 is a self-contained can type combustor having generally cylindrical shape over the majority of its length but which is tapered at an outlet end so as to narrow towards the outlet. Each combustor 10 is elongate (that is to say having a length greater than its diameter) and has a longitudinal axis Y extending in the direction of flow through the combustor. In the present embodiment, the combustors are longitudinally curved circumferentially about the axis Z. That is to say, the longitudinal axis Y of each combustor 10 is curved in a circumferential direction about the axis Z. Each combustor 10 has an outer tube 72 and an inner tube 74 located inside the outer tube 72. The outer dimeter of the inner tube 74 is smaller than the inner diameter of the outer tube 72 so that an annular gap 73 is present between the inner and outer tubes. The inner tube 74 is perforated so that air can flow from the annular gap 73 into the inner tube 74.

Figure 7:
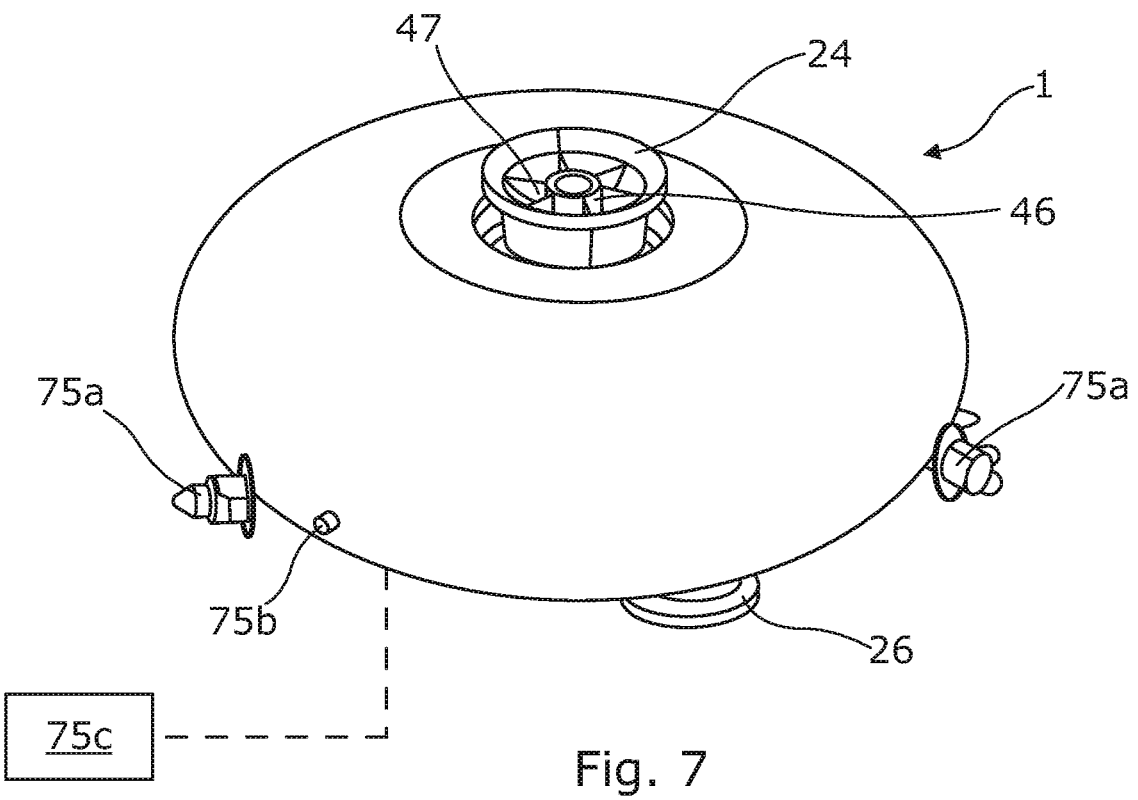
FIG. 7 is a further perspective view of the engine showing the location of fuel injectors and spark ignitors.
Figure 8:
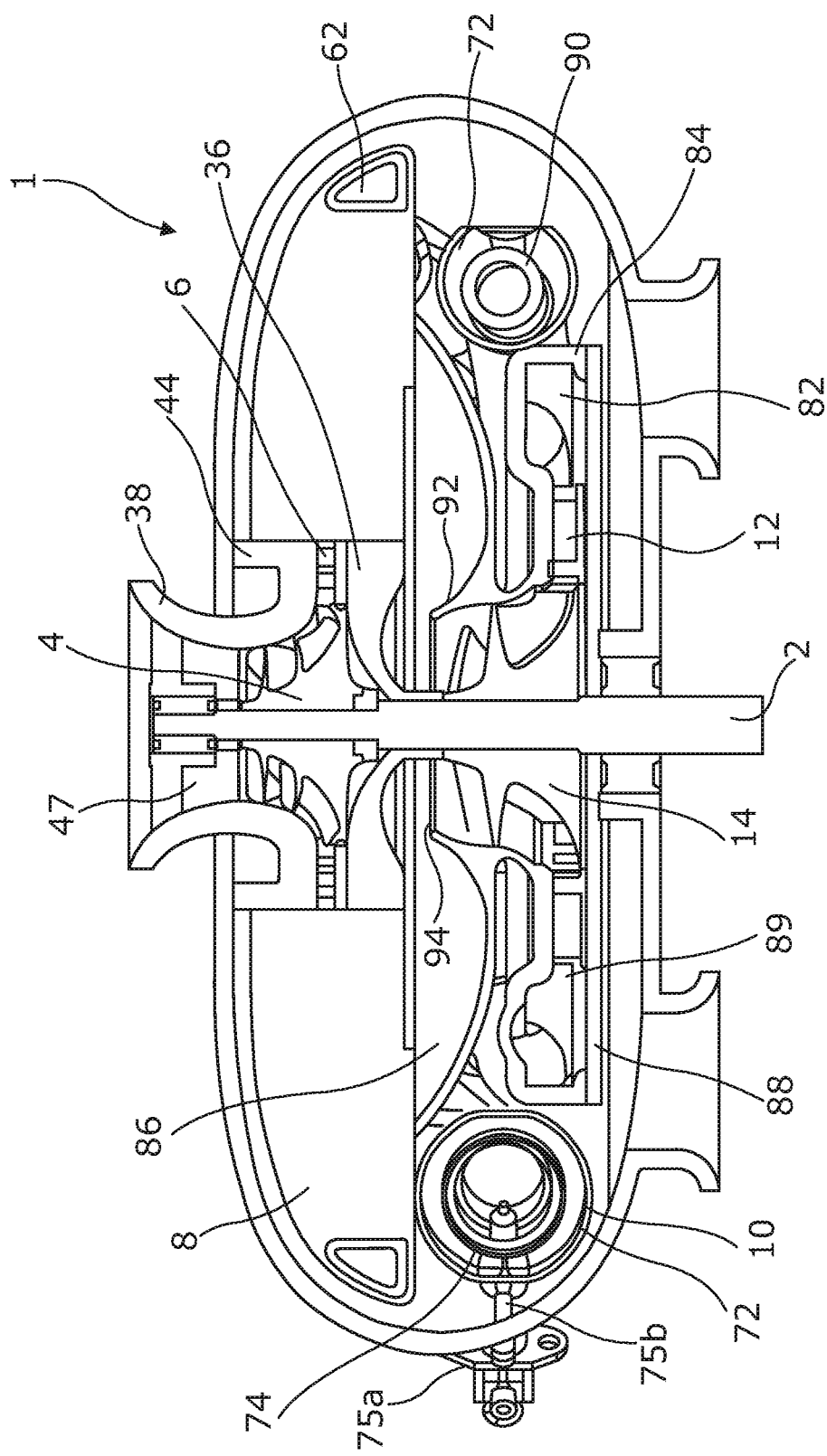
FIG. 8 is a view similar to that of FIG. 4 but additionally showing the fuel injectors and spark ignitors.

The engine has a fuel injection and ignition system for injecting fuel into the inner tube 74 of each combustor 10 and for igniting a fuel/air mixture inside the inner tube 74, where combustion takes place. The fuel injection system includes a fuel injector 75a and a spark ignitor 75b for each combustor 10. As illustrated in FIGS. 7 and 8, each injector 75a and ignitor 75b is mounted through a suitable aperture in the casing so as to extend into a respective combustor 10 with suitable sealing arrangements. The fuel injectors 75a are connected with a fuel source and are configured to direct fuel into their respective combustor. The spark ignitors 75b are connected with an electrical supply to create a spark to ignite the fuel in their respective combustors. The engine has an electronic control system (indicated schematically at 75c) which is connected with each fuel injector 75a and spark ignitor 75b to regulate operation of the engine. The control system may have an ICU or other programmable processor.

Each combustor 10 has an inlet end 76 and an outlet end 78. At the inlet end 76, the outer tube 72 is fluidly connected with the buffer channel 62 by means of a tube 80 which directs air from the recuperator into the annular gap 73 between the inner and outer tubes 72, 74. The tubes 80 direct the air flow in a principally in a circumferential direction about the axis Z from the buffer channel 62 into the combustors 10. The air flow buffer channel 62 may be divided into separate sectors, each sector fluidly connected with one of the combustors or it may extend continuously about the circumference of the recuperator. In this latter arrangement, the buffer channel defines a continuous flow path extending circumferentially about the outer diameter region of the recuperator. From the annular gap 73, the air flows into the inner tube 74 to be mixed with fuel. At the outlet end of each combustor 10, the inner tube 74 is tapered to define an outlet through which exhaust gas is directed into an annular exhaust gas flow channel 82 which circumferentially surrounds the nozzle 12, as indicated schematically by arrow C.

The annular exhaust gas flow channel 82 is defined in a turbine stage housing 84, which houses the turbine wheel 14 and the nozzle 12 and may be divided into separate sectors for each combustor or may be a single continuous flow path extending circumferentially about the nozzle 12. The turbine housing 84 includes a first turbine housing member 86 which locates about a forward side of the turbine wheel 14 and nozzle 12 and a second turbine housing member 88 which locates about the rearward side of the turbine wheel 14 and nozzle 12. The turbine housing 84 defines an annular outlet opening 89 from the annular flow channel 82 through which exhaust gas passes to enter the nozzle 12, which directs the exhaust gas on to the blades of the turbine wheel 14. The first turbine housing member 86 defines three circumferential spaced sockets 90 about an outer circumferential region. Each socket 90 receives an outlet end of a respective combustor 10 and defines a flow path for directing exhaust gas circumferentially in to the exhaust gas flow channel 82 and the outlet opening 89. The first turbine housing member 86 has a radial front wall 91 having a part-dome shaped portion 92 which encases the blades of the turbine wheel 14. The radial front wall 91 has a central opening 94 in the part-domed portion 92 through which exhaust gas exiting the turbine wheel 14 passes into a space between the turbine housing 84 and the second compressor housing member 36 from where the exhaust gas flows to enter the second set of flow passages 60 in the recuperator 8, as indicated by arrow D. Radially outside of the part-dome portion 92, the front wall 91 is curved in the opposite direction to the part-domed portion 92 to guide the exhaust gas smoothly into the recuperator. The first and second turbine stage housing members 86, 88 combine with the casing 18 and shaft 2 to define an enclosure or plenum through which exhaust gas form the combustors 10 is directed on to the nozzle and turbine wheel.

Exhaust gas entering the second set of flow passages 60 is directed axially in a forwards direction towards the inlet side wall 20 of the outer casing 18. When the exhaust gas exits the recuperator 8, it flows radially outwardly and in a rearwards axial direction following the curvature of the inner surface of the outer casing 18 about the combustors 10 to exit through the outlet nozzles 26, as indicated by arrow E.

Operation of the engine 1 whilst running in a steady state will now be described.

Ambient air A from outside the engine is drawn in through the inlet nozzle 24 by the rotating compressor wheel 4 which directs the air radially outwardly through the diffuser 6 (arrow B). The air is compressed as it passes through the compressor wheel 14 and diffuser 6. The compressed air exiting the diffuser 6 passes through outlets between the first and second compressor housing members 34, 36 to enter the first set of flow passages 58 through the recuperator 8. The compressed air flows in a radially outward direction through the first set of flow passages 58 and into the air buffer channel 62. Heat is transferred from exhaust gas passing through the second set of flow passages 60 in the recuperator into the compressed air as it passes through the recuperator so that the temperature of the compressed air is increased by the time it reaches the buffer channel 62.

From the buffer channel 62, the pre-heated compressed air is directed into the combustion chambers 10 where it is mixed with fuel. The air/fuel mixture is ignited inside the inner tubes 74 of the combustion chambers and combustion takes place producing a high-temperature, high-velocity exhaust gas flow which is directed on to the turbine wheel 14 through the annular flow channel 82 and the nozzle 12 (arrow C).

The high-temperature, high-velocity gas flow expands as it passes through the turbine wheel 14, producing a turbine shaft work output in the process which drives the shaft 2. The turbine shaft work is used to drive the compressor wheel 4 and can be used to drive other ancillary equipment, such as an electric generator, that may be coupled to the shaft 2.

The exhaust gas exiting the turbine wheel 14 (arrow D) is directed through the second set of flow passages 60 in the recuperator 8 where heat energy is transferred from the exhaust gas into the compressed air passing through the first flow passages 58. On exiting the second flow passages 60 of the recuperator, the exhaust gas is directed radially outwardly to flow about the curved inner surface of the casing 5 towards the exhaust nozzles 26 where it exits the engine (arrow E).

In a modification to the embodiment as shown and described above, the structure of the recuperator 8 is modified so that the second flow passages 60 extend generally in a radial direction or in a part radial, part axial direction. The exhaust gas is conducted from the turbine 14 to a radially outer edge region of the recuperator to enter the second flow passages and flows radially inwardly through the second flow passages in the opposite direction to the flow of compressed air through the first flow passages 58. This would enable a greater transfer of energy from the exhaust gas to the pressurised air than in the cross flow arrangement where the second flow passage extend axially. It should be noted though that the recuperator can be configured so that the air and gas flow through the recuperator in opposite directions, in generally opposing directions but at an angle or in cross flow directions.

In a further modification, the position at which the exhaust gas leaves the engine can be changed from that described. For example, one or more exhaust gas outlet nozzles 26 could be located at the front of the engine, on the same side as the air inlet nozzle 24, or indeed at any suitable location. This further modification can be adopted regardless of the orientation of the second flow passages 60 in the recuperator 8.

The configuration of the engine 1 in accordance with an aspect of the invention provides increased efficiency when compared with some known gas turbine engines of comparable size.

A particular feature of the engine 1 is that the flow of air and exhaust gas through the engine follows a largely circular path about the axis Z of the turbine shaft with smooth changes of direction which are generally no greater than 90 degrees between the compressor and the turbine. The air/exhaust gas flow follows a core flow path through the engine having a mixture of axial, radial and circumferential components. For example, the compressed air from the compressor wheel 4 and diffuser 6 flows radially outwardly through the recuperator 8 rather than being turned through 90° to flow axially through the recuperator as is the case with many known micro-turbines. A particular feature of the air/exhaust gas flow path are the generally circular, spiralling flow paths from the air buffer channel 62 through the combustors 10 into the radial turbine wheel 14. The positioning of the combustors 10 radially outboard of the nozzle 12 together with the alignment of the combustors with their axes Y extending transversely to the axis Z enables the air/gas to be directed circumferentially in a generally spiralling flow path from the aid buffer channel 62 into the combustors 10 through the tubes 80 and from the outlet ends 78 of the combustors into the annular exhaust gas flow channel 82 through the sockets 90. The combustors 10 may be located radially inboard of the air flow buffer channel 62 or at least with their inlet ends generally at the same radial distance from the axis Z so that the flow from the buffer channel 62 into the combustors is smooth. Whilst the flow is not entirely within the same plane, the axial component of the flow is minimal and the flow is predominantly in a plane transvers to the axis Z of the turbine shaft 2. The configuration of the engine 1 also minimises the distance the exhaust gas flows when exiting the turbine 14 before entering the recuperator 8. This also contributes to the overall efficiency of the engine 1 and is due at least in part to the turbine 14 being mounted with its blades facing in the same direction as those of the compressor wheel 4 and so directing the exhaust gas forwardly towards the recuperator 8.

Furthermore, the configuration of the engine 1 allows for the use of a relatively large recuperator for increased efficiency whilst maintaining the overall compactness of the engine. In addition, the size of the diffuser 6 and nozzle 12 are not constrained by the configuration of the recuperator as is the case in many known micro-turbines. Different sized diffusers 6 can be accommodated by varying the inner dimeter of the recuperator 8, for example.

The curved, cylindrical combustion chambers 10 are relatively long providing for greater efficiency. The shape of the combustors 10 with tapering outlet ends is also beneficial since the shape reflects the shape of a flame, this has been found to also improve efficiency in comparison with annular combustion chambers which tend to flatten out the flame. Whilst curved combustors 10 are advantageous in providing an increased length of the combustor and smooth, circular flow of gas from the recuperator 8 to the turbine wheel 14, the combustors 10 could be straight or partially curved. In which case, the longitudinal axes of the combustors 10 could be angled/skewed transversely relative to the axis Z of the engine by up to 90 degrees to the axis Z of the engine such that the combustors 10 are aligned perpendicular to the axis Z. Particularly where the combustors are straight, they could be inclined so that their outlet ends 78 are radially inboard (closer to the axis Z) than their inlet ends 74. Straight combustors may be arranged with their longitudinal axes extending tangentially to a circle drawn concentrically about the axis Z of the turbine shaft.

The configuration of the engine 1 provides for an engine which is relatively thin and flat and so is more axially compact than known micro- and mini-turbines. The shape of the engine 1 allows it to be readily accommodated in confined spaces and is a particular advantage for use in applications where space is limited, such as in a motor vehicle. The use of can type combustors 10 having their axes Y aligned perpendicular (normal) to the axis Z provides for relatively long combustors whilst minimising the length or depth of the engine in the axial direction and also minimising the length of the turbine shaft 2. This is particularly true where the combustors 10 also curve about the axis Z. However, some benefit could still be obtained even if the combustors are not aligned perpendicular to the axis Z provided they are skewed or angled transversely relative to the axis Z to at least some extent so as to reduce the overall length/depth of the engine in the axial direction when compared with an engine in which the combustors have their longitudinal axes parallel to the axis of the turbine shaft. The longitudinal axis of each combustion chamber may be skewed generally in a transverse direction relative to the axis of the turbine shaft by at least 30 degrees, or by at least 40 degrees, or by at least 45 degrees, or by at least 50 degrees, or by at least 55 degrees, or by at least 65 degrees, or by at least 70 degrees, or by at least 75 degrees, or by at least 80 degrees, or by at least 85 degrees, or by 90 degrees. In relation to a curved combustion chamber, reference could be made to a longitudinal plane of the combustion chamber being skewed generally in a transverse direction relative to the axis of the turbine shaft rather than to the axis itself in the various statements made herein. In this case, the longitudinal plane is a plane which splits the combustion chamber in half and which plane also passes through the turbine shaft.

It should be noted that the longitudinal axes of the combustion chambers in the gas turbine of the present embodiment do not converge at a single point and in particular do not converge at the longitudinal axis of the turbine shaft. Indeed, the longitudinal axes of the combustion chambers, if extended, do not intersect the longitudinal axis of the turbine shaft. It will also be noted that the longitudinal axes of the combustion chambers do not lie in planes extending longitudinally through the axis of the turbine shaft. In other words, the axes of the combustion chamber are not aligned purely in an axial direction of the engine. The longitudinal axis of each combustion chamber is skewed relative to any plane extending longitudinally through the axis of the turbine shaft and which passes through the longitudinal axis of the combustion chamber.

In a further refinement, the control system 75c is operative to independently control combustion in each of the combustion chambers 10 in dependence on certain operating parameters of the engine. For example, the engine control system may be configured to allow for selective use of combustion chambers 10 whilst the engine is running so that under certain operating conditions, not all of the combustion chambers 10 are used. Thus when operating at less than full power, the engine 1 could be operated with combustion taking place in only one or two of the combustion chambers, or with different combustion rates in some or all of the chambers 10, to further improve efficiency. This could be achieved by varying the amount of fuel introduced into each combustor independently. Where only one or some of the available combustors are to be used, no fuel may be introduced into those combustors which are not used. It should also be appreciated that the number of combustion chambers 10 can be varied and that the engine 1 could be provided with one, two or more than three combustion chambers 10 if desired.

Whilst the use of a recuperator 8 in the embodiment described above is advantageous in increasing the overall efficiency of the gas turbine engine, many advantages of the present invention can be obtained in a gas turbine engine which does not incorporate a recuperator. FIGS. 9 to 12 illustrates an embodiment of a gas turbine engine 101 in accordance with the invention which does not have a recuperator.

In the following description, the same reference numerals but increased by 100 will be used to indicate features that are the same as, or which perform a similar function to, those described above in relation to the previous embodiment.

The gas turbine engine 101 is constructed and operated substantially in a similar manner to the previous embodiment 1 described above and so only the major differences will be described. The reader should refer to the above description of the previous embodiment for further detail.

As discussed above, the engine 101 is a simplified engine which does not have a recuperator. As a consequence, the air flow from the centrifugal compressor wheel 104 and diffuser 106 is directed into an annular air buffer channel 162 from which it is directed into the combustors 110. As in the previous embodiment, there are three, curved can type combustors 110 circumferentially disposed in an annulus about the nozzle 124 and turbine wheel 114. The combustors 110 in this embodiment may be constructed and operated substantially the same as the combustors 10 in the previous embodiment described above including any modifications as discussed.

As illustrated in FIGS. 10 and 11, the compressed air flow buffer channel 162 extends circumferentially outboard of the diffuser 106. Air from the diffuser enters the air flow buffer channel 162 through an annular slot or a series on openings in a wall of the channel at its inner circumference. The inlet end of each combustor 110 is fluidly connected with the air flow buffer channel 162 by a respective tube 180 or other fluid connection. As indicated by the lines 196, the air flow buffer channel may be divided into separate sectors, each sector being fluidly connected with a respective tube 180 and combustor 110. In this arrangement, the compressed air does not flow from one sector to another but enters each sector from the diffuser and flows around the sector into the respective tube 180 and combustor 110. Alternatively, the air flow buffer channel 162 may not be divided into separate sectors but define a circumferentially continuous flow path along which the air can flow to enter the any of the various tubes 180 and combustors 110. The air flow buffer channel 62 in the first embodiment may be similarly divided into separate sectors or not. It will be noted that the combustors 110 are not shown in FIG. 11.

FIG. 12 illustrates schematically how the combustors 110 are fluidly connected with an annular exhaust gas flow channel 182 extending circumferentially about the nozzle 112 and turbine wheel 114 in the turbine stage. The exhaust gas flow channel 182 is formed in a similar manner to the channel 82 in the first embodiment and is defined inside the turbine stage housing 184. The outlet end of each combustor 110 is fluidly connected with the exhaust gas flow channel 182 by a respective tubular socket 190 or other suitable flow connection. It will be noted that the sockets 190, as with the sockets 90 in the first embodiment, are curved circumferentially so as to provide a smooth flow path between each combustor 110 and the exhaust gas flow channel which spirals about the axis X of the turbine shaft. The tubes 180 connecting the air flow buffer channel 162 with the combustors 110 are similarly curved circumferentially about the axis of the turbine shaft so that the tubes 180, the combustors 110 and the sockets 190 define a smooth, circumferentially extending flow path through each combustor 110 from the air flow buffer channel 162 to the exhaust gas flow channel 182 which spirals about the axis X of the turbine shaft.

Because there is no requirement to direct the exhaust gasses from the turbine wheel 114 forwardly to a recuperator, the turbine wheel 114 and the nozzle 112 are mounted to the turbine shaft 102 with their blades facing the rear of the engine, that is to say in the opposite direction to the compressor wheel 104 so that exhaust gases are sent directly out of the housing 16 through an central outlet/exhaust nozzle 126 defined by the turbine stage housing 184.

The gas turbine engine 101 benefits from many of the advantages of the previous embodiment, including the smooth air/gas flow paths which generally circulate about the axis Z of the shaft 102 and the flattened, circular overall shape as compared to the cylindrical shape of known micro- and mini-gas turbine engines.

Gas turbine engines 1, 101 in accordance with the various aspects of the invention are expected to have a broad range of applications including but not limited to:

As a range extender for electric motor vehicles, especially motor cars. Together with an electric generator, the engine can produce electricity on-board and greatly extend the travelling range of electric cars.

The engine can be scaled up or down without losing much efficiency to suit a range of vehicles, such as boats, motorbikes, and even electric bicycles.

As a power source to replace batteries for heavy duty multi-rotary winged UAVs.

As a distributed power generator.

As a backup power source.

For use in generating electrical power, whether for distributed power generation or as part of a vehicle or any other application, the engine 1, 101 may be combined with an electoral generator into a single assembly.

Whilst engines in accordance with the present invention are expected to have particular application in situations requiring relatively low power output, say in the range of 15 kW to 1 MW, due to the scalability of the engine configuration, it is believed that engines in accordance with an aspect of the present invention could be produced with a power output in the range of 10 watt up to 2.5 gigawatt.

The above embodiments are described by way of example only. Many variations are possible without departing from the scope of the invention in its various aspects as defined in the appended claims and set out in the various statements of invention in the summary of invention above.

The invention claimed is:

1. A gas turbine engine comprising:
an inlet end and an exhaust end opposite said inlet end;
a turbine shaft rotatable about an axis, the turbine shaft extending longitudinally between the inlet end and the exhaust end;
a centrifugal compressor mounted to the turbine shaft toward the inlet end and rotatable with the turbine shaft about the axis of the turbine shaft;
a radial turbine mounted to the turbine shaft toward the exhaust end and rotatable with the turbine shaft about the axis of the turbine shaft;
a plurality of combustion chambers spaced circumferentially about the axis of the turbine shaft axially between the centrifugal compressor and the radial turbine; and
a circumferentially extending air flow buffer channel between the centrifugal compressor and the plurality of combustion chambers, the air flow buffer channel comprising a plurality of sectors, each sector of the plurality of sectors fluidly connected with a respective combustion chamber of the plurality of combustion chambers,
wherein an output of the centrifugal compressor enters each sector of the plurality of sectors and flows circumferentially around each sector of the plurality of sectors and into the respective combustion chamber of the plurality of combustion chambers,
a respective output of each combustion chamber of the plurality of combustion chambers is directed onto the radial turbine, and
an output of the radial turbine is directed toward the inlet end of the gas turbine engine.

2. A gas turbine engine as claimed in claim 1, wherein each combustion chamber of the plurality of combustion chambers has a respective axis extending from a respective inlet of each combustion chamber of the plurality of combustion chambers to a respective outlet of each combustion chamber of the plurality of combustion chambers, the respective axis of each combustion chamber curves about the axis of the turbine shaft.

3. A gas turbine engine as claimed in claim 1, wherein each combustion chamber of the plurality of combustion chambers has a respective axis extending from a respective inlet of each combustion chamber of the plurality of combustion chambers to a respective outlet of each combustion chamber of the plurality of combustion chambers, the respective axis of each combustion chamber is inclined radially relative to a plane extending transversely to the axis of the turbine shaft.

4. A gas turbine engine as claimed in claim 1, wherein each combustion chamber of the plurality of combustion chambers has a respective axis extending from a respective inlet of each combustion chamber of the plurality of combustion chambers to a respective outlet of each combustion chamber of the plurality of combustion chambers, the respective axis of each combustion chamber lies in a common plane extending transversely to the axis of the turbine shaft.

5. A gas turbine engine as claimed in claim 1, wherein each combustion chamber of the plurality of combustion chambers is tubular from a respective inlet to a respective outlet of each combustion chamber of the plurality of combustion chambers.

6. A gas turbine engine as claimed in claim 5, wherein each combustion chamber of the plurality of combustion chambers is tapered at a respective end of the respective outlet.

7. A gas turbine engine as claimed in claim 1, the gas turbine engine further comprising an annular recuperator having a first set of flow passages for receiving the output of the centrifugal compressor and a second set of flow passages interleaved between the first flow passages, the second set of flow passages being fluidly connected with the radial turbine to receive the output of the radial turbine.

8. A gas turbine engine as claimed in claim 7, wherein the annular recuperator surrounds the centrifugal compressor, the first set of flow passages extending radially.

9. A gas turbine engine as claimed in claim 8, wherein the second set of flow passages extend radially.

10. A gas turbine engine as claimed in claim 7, wherein the circumferentially extending air flow buffer channel is fluidly connected with the first set of flow passages.

11. A gas turbine engine as claimed in claim 1, the gas turbine engine further comprising a diffuser located circumferentially about an outer diameter of the centrifugal compressor, the diffuser configured to direct the output of the centrifugal compressor radially outwardly.

12. A gas turbine engine as claimed in claim 1, the gas turbine engine further comprising:
a nozzle located circumferentially about an outer diameter of the radial turbine for directing the respective output of each combustion chamber of the plurality of combustion chambers onto the radial turbine; and
an exhaust gas flow buffer channel extending circumferentially about the nozzle, the exhaust gas flow buffer channel being fluidly connected with the plurality of combustion chambers and with the nozzle.

13. A gas turbine engine as claimed in claim 12, wherein the circumferentially extending air flow buffer channel is fluidly connected with the plurality of combustion chambers and wherein a respective fluidic path extends from the circumferentially extending air flow buffer channel through each combustion chamber of the plurality of combustion chambers to the exhaust gas flow buffer channel and circulates about the axis of the turbine shaft.

14. A gas turbine engine as claimed in claim 1, wherein blades of the centrifugal compressor and blades of the radial turbine are configured such that upon rotation of the turbine shaft the output of the radial turbine is directed toward the inlet end of the gas turbine engine.

15. A gas turbine engine as claimed in claim 1, the gas turbine engine further comprising an engine control system configured to independently control combustion in each combustion chamber of the plurality of combustion chambers, the engine control system being configured to vary a number of combustion chambers of the plurality of combustion chambers in which combustion takes place whilst the gas turbine engine is running depending on operating parameters of the gas turbine engine.

16. A gas turbine engine as claimed in claim 12, wherein the gas turbine engine is configured such that for each combustion chamber of the plurality of combustion chambers, a respective fluid path is defined which spirals radially inwardly about the axis of the turbine shaft through the respective combustion chamber of the plurality of combustion chambers and into the exhaust gas flow buffer channel.

17. A gas turbine engine as claimed in claim 1, wherein each combustion chamber of the plurality of combustion chambers comprises a respective outer tube and a respective inner tube located inside the respective outer tube, an outer diameter of the respective inner tube being smaller than an inner diameter of the respective outer tube so that an annular gap is present between the respective inner tube and the respective outer tube, the respective inner tube being perforated so that air can flow from the annular gap into the respective inner tube, the respective outer tube at a respective inlet end of the respective combustion chamber being fluidly connected with the circumferentially extending air flow buffer channel by a respective tube which directs an output of the air flow buffer channel into the annular gap between the respective inner tube and the respective outer tube of the respective combustion chamber of the plurality of combustion chambers.

18. A gas turbine engine comprising:
   an inlet end and an exhaust end opposite said inlet end;
   a turbine shaft rotatable about an axis, the turbine shaft extending longitudinally between the inlet end and the exhaust end;
   a centrifugal compressor and a radial turbine each mounted to the turbine shaft for rotation with the turbine shaft about the axis of the turbine shaft, the centrifugal compressor mounted to the turbine shaft toward the inlet end and the radial turbine mounted to the turbine shaft toward the exhaust end;
   an annular recuperator circumferentially surrounding the centrifugal compressor and
   at least one combustion chamber in a gas flow path between the annular recuperator and the radial turbine, the at least one combustion chamber located axially between the centrifugal compressor and the radial turbine,
   exhaust gas from the at least one combustion chamber is directed onto the radial turbine, and the exhaust gas of the radial turbine is directed toward the inlet end of the gas turbine engine and to the annular recuperator,
   wherein the annular recuperator comprises:
      a first set of flow passages which receive compressed air from the centrifugal compressor, the first set of flow passages extending in a radial direction relative to the axis of the turbine shaft; and
      a second set of flow passages interleaved between the first flow passages, the second set of flow passages being fluidly connected with the radial turbine to receive the exhaust gas from the radial turbine, the second set of flow passages extending in the radial direction relative to the axis of the turbine shaft,
      wherein, the compressed air flows in a radially outward direction through the first set of flow passages and the exhaust gas flows in a radially inward direction through the second set of flow passages.

19. A gas turbine engine as claimed in claim 18, the gas turbine engine comprising a plurality of combustion chambers including the at least one combustion chamber, wherein the plurality of combustion chambers are positioned radially outboard of an inner diameter of the annular recuperator and radially inboard of an outer diameter of the annular recuperator.

* * * * *